US012338065B2

(12) United States Patent
Downing et al.

(10) Patent No.: US 12,338,065 B2
(45) Date of Patent: Jun. 24, 2025

(54) WASTE RECEPTACLES

(71) Applicant: Rubbermaid Commercial Products LLC, Atlanta, GA (US)

(72) Inventors: Brian Wortham Downing, Charlotte, NC (US); Ryan M. Baker, Charlotte, NC (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 2 days.

(21) Appl. No.: 18/447,005

(22) Filed: Aug. 9, 2023

(65) Prior Publication Data

US 2024/0059481 A1 Feb. 22, 2024

Related U.S. Application Data

(60) Provisional application No. 63/371,549, filed on Aug. 16, 2022.

(51) Int. Cl.
*B65F 1/06* (2006.01)

(52) U.S. Cl.
CPC .................................... *B65F 1/067* (2013.01)

(58) Field of Classification Search
CPC .. B65F 1/067; B65F 1/163; B65F 1/06; B65F 1/0073; B65F 1/1415
USPC ........................................ 220/495.08, 495.09
See application file for complete search history.

(56) References Cited

U.S. PATENT DOCUMENTS 4,294,379 A * 10/1981 Bard ........................ B65F 1/068 220/908
4,576,310 A * 3/1986 Isgar .......................... B65F 1/06 220/495.1
4,938,380 A * 7/1990 Donahoe .................... B65F 1/06 220/495.1
4,974,746 A * 12/1990 Dickinson ............. B65F 1/0046 248/101
5,232,186 A * 8/1993 Corkery .................. B65F 1/067 211/12
5,310,078 A * 5/1994 Strawder ............... B65F 1/1607 220/826

(Continued)

OTHER PUBLICATIONS

Rubbermaid Product (Amazon) "Premier 13g Step-On" https://www.amazon.com/Rubbermaid-2129977-Premier-Stainless-Charcoal/dp/B08LMZXYVN?th=1, Accessed Aug. 9, 2023, 1 page.

*Primary Examiner* — Don M Anderson
(74) *Attorney, Agent, or Firm* — Eversheds Sutherland (US) LLP

(57) ABSTRACT

A waste receptacle may include a housing, a rectangular rim defining a rim opening, and a plurality of retention tabs extending from the rim. The plurality of retention tabs includes a notched retention tab defining a retention notch between first and second tab portions. The first and second tab portions are configured to respectively retain first and second liners received within the rim opening being diagonally opposed. The plurality of retention liners is configured to receive a larger third liner. The waste receptacle may include a cinch extending from the rim. The cinch may include a cinch base defining a pair of openings, and a cinch tab between the openings. The cinch tab may extend from the cinch base. The cinch is configured to receive a portion of a liner received in the rim opening between the openings and across the cinch tab.

17 Claims, 4 Drawing Sheets

(56) References Cited

U.S. PATENT DOCUMENTS

| | | | | | |
|---|---|---|---|---|---|
| 5,803,299 | A * | 9/1998 | Sealy, Jr. | B65F 1/062 | 220/495.07 |
| 6,102,239 | A * | 8/2000 | Wien | B65F 1/062 | 220/495.07 |
| 6,123,215 | A * | 9/2000 | Windle | B65F 1/062 | 220/495.07 |
| D493,267 | S * | 7/2004 | Strobel | D34/7 | |
| 9,027,778 | B1 * | 5/2015 | Slawinski, Jr. | B65F 1/141 | 220/495.04 |
| 10,099,855 | B1 * | 10/2018 | Higgins, II | B65F 1/1415 | |
| D925,857 | S * | 7/2021 | Downing | D34/9 | |
| 2006/0060595 | A1 * | 3/2006 | Anderson | B65F 1/068 | 220/890 |
| 2007/0084867 | A1 * | 4/2007 | F. Namdarian | B65F 1/06 | 220/495.08 |
| 2007/0202751 | A1 * | 8/2007 | Wentz | B23P 11/00 | 439/675 |
| 2008/0116205 | A1 * | 5/2008 | Forest | B65F 1/0006 | 220/495.1 |
| 2009/0050628 | A1 * | 2/2009 | Sullivan | B65F 1/06 | 220/495.1 |
| 2012/0111868 | A1 * | 5/2012 | Banus | B65D 25/16 | 220/495.08 |
| 2013/0105486 | A1 * | 5/2013 | Mashburn | B65F 1/163 | 220/264 |
| 2013/0167333 | A1 * | 7/2013 | Andersson | B65F 1/06 | 24/545 |
| 2018/0072497 | A1 * | 3/2018 | Burns | B65F 1/0006 | |
| 2019/0009982 | A1 * | 1/2019 | Lu | B65D 43/24 | |
| 2019/0071247 | A1 * | 3/2019 | Dzirbik | B65F 1/0066 | |
| 2021/0253343 | A1 * | 8/2021 | Downing | B65F 1/06 | |
| 2022/0315326 | A1 * | 10/2022 | Logan | B65F 1/004 | |
| 2023/0294913 | A1 * | 9/2023 | Collins | B65F 1/067 | 220/495.06 |
| 2024/0059481 | A1 * | 2/2024 | Downing | B65F 1/067 | |

* cited by examiner

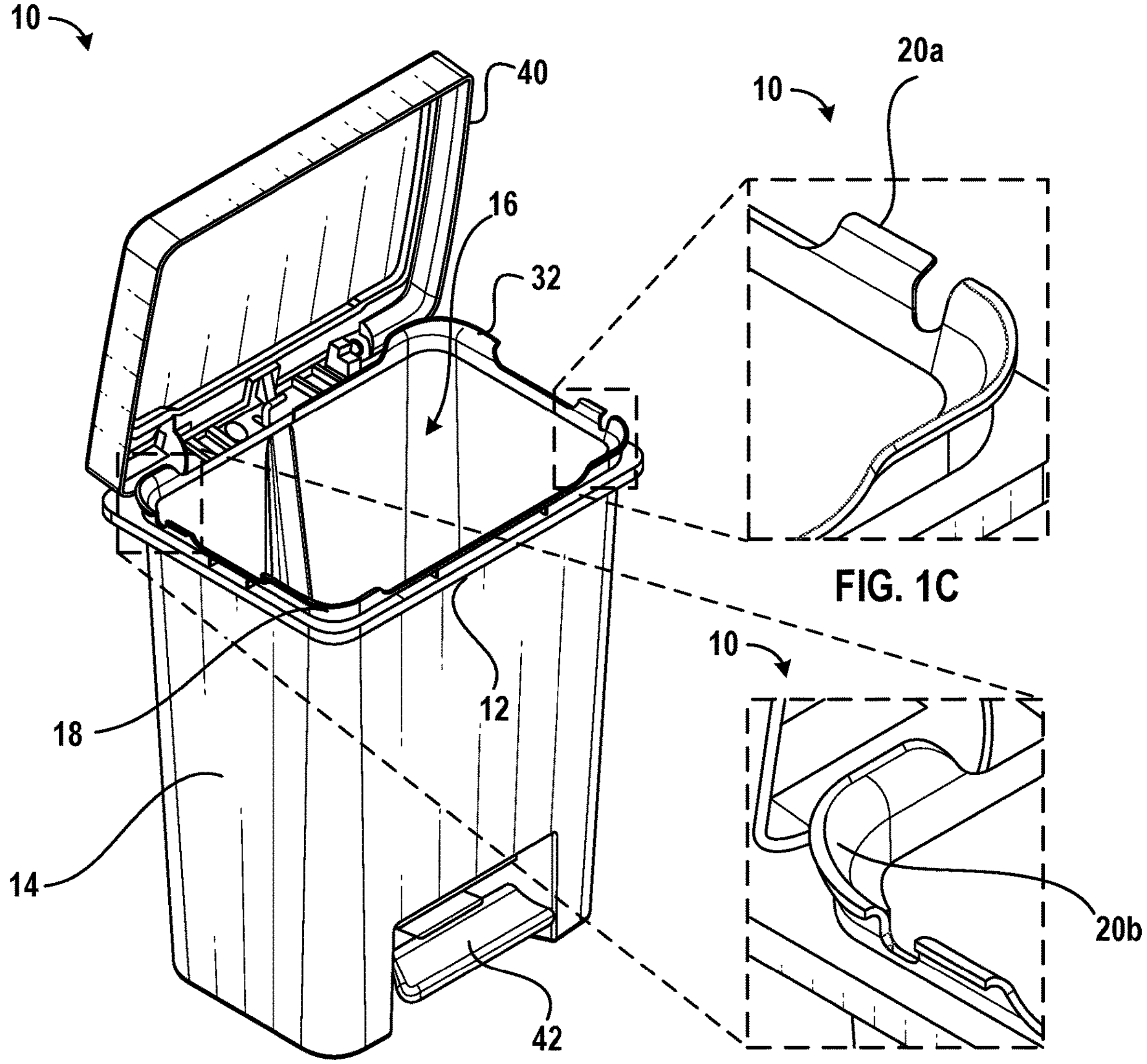
FIG. 1A
FIG. 1C
FIG. 1D
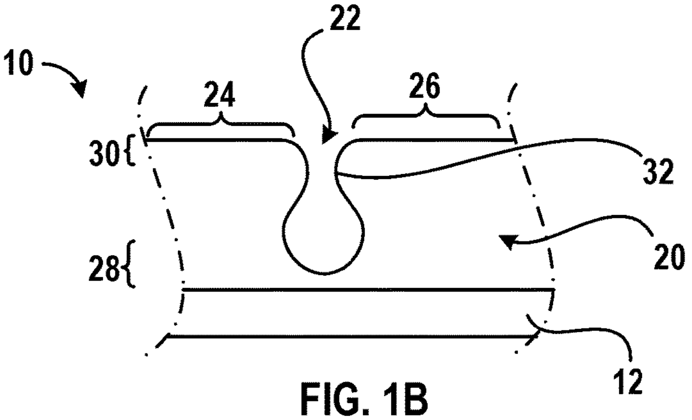
FIG. 1B

WASTE RECEPTACLES

CROSS-REFERENCE TO RELATED APPLICATION

This application claims the benefit of U.S. application Ser. No. 63/371,549, filed Aug. 16, 2022, the entirety of which is hereby incorporated by reference.

TECHNICAL FIELD

The present disclosure is generally in the field of waste receptacles, and more particularly related to waste receptacles configured to receive multiple liners.

BACKGROUND

Waste receptacles may be used for holding and disposal of a variety of material such as trash, recyclables, yard waste, industrial waste, commercial waste, or medical waste. Waste receptacles may be used in various environments, including kitchens, restrooms, workplaces, or living areas. Waste receptacles are of varying varieties.

Waste liners are often used with waste receptacles to promote hygiene and sanitation. Liners may simplify maintenance of waste receptacles. For example, instead of having to replace, empty, wash, or clean the waste receptacle itself, the liner can be removed and discarded with the waste, and replaced with a fresh liner.

SUMMARY

The present disclosure describes waste receptacles configured to removably receive and secure liners of different sizes or multiple liners. For example, a user may use a multiple small liners in a same receptacle to receive waste from different sources, or may use a single large liner in that same receptacle when a larger amount of waste is expected to be received. The user may also choose to use a single small liner when a larger amount of waste is expected to be received.

In embodiments, the present disclosure describes a waste receptacle. The waste receptacle includes a housing, a rectangular rim defining a rim opening, and a plurality of retention tabs extending from the rim. The plurality of retention tabs includes a notched retention tab defining a retention notch between first and second tab portions. The first and second tab portions are configured to respectively retain first and second liners received within the rim opening. The first and second liners may be diagonally opposed along the rim opening. The plurality of retention tabs may be configured to receive a third liner larger than each of the first and second liners.

In embodiments, the present disclosure describes a waste receptacle. The waste receptacle includes a rim defining a rim opening, and a plurality of retention tabs extending from the rim. The plurality of retention tabs includes a notched retention tab defining a retention notch between first and second tab portions. The first and second tab portions are configured to respectively retain first and second liners received within the rim opening.

In embodiments, the present disclosure describes a waste receptacle. The waste receptacle includes a rim defining a rim opening, and a cinch extending from the rim. The cinch includes a cinch base defining a pair of openings, and a cinch tab between the pair of openings. The cinch tab may extend from the cinch base away from the rim opening. The cinch is configured to receive a portion of a liner received in the rim opening between the openings and across the cinch tab.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 1A is a perspective view of a waste receptacle including a rim and a plurality of retention tabs.

FIG. 1B is a partial front view of the waste receptacle of FIG. 1 showing a notched retention tab extending from the rim.

FIG. 1C is a partial perspective view of the waste receptacle of FIG. 1A showing a first notched retention tab.

FIG. 1D is a partial perspective view of the waste receptacle of FIG. 1A showing a second notched retention tab.

Figure 2A:
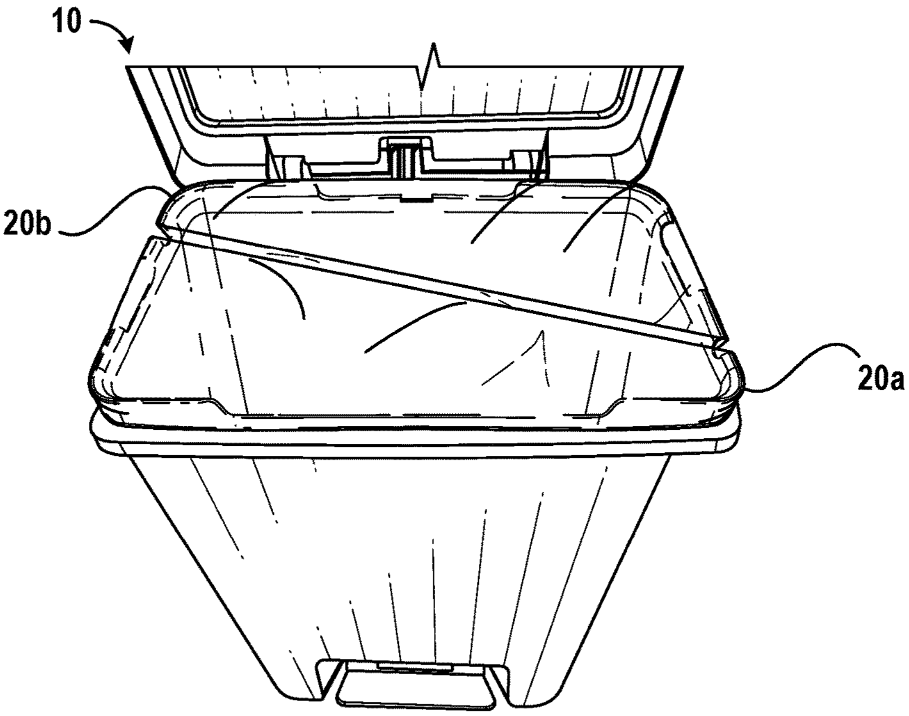
FIG. 2A is a partial perspective view of the waste receptacle of FIG. 1A receiving two small liners secured in the plurality of retention tabs.

The present disclosure provides a more detailed and specific description with reference to the accompanying drawings. The drawings and specific descriptions of the drawings, as well as any specific or other embodiments discussed, are intended to be read in conjunction with the entirety of this disclosure.

DETAILED DESCRIPTION

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical elements throughout.

A user may prefer treating waste from different sources in different ways. For example, a user may prefer to compost compostable waste, send to a recycling facility recyclable waste, and send to a landfill waste that cannot be composted or recycled. A user may also expect different amounts of waste at different times. For example, a user may expect a larger amount of waste during an event, such as a party or a gathering. Using multiple waste receptacles for different types and amounts of waste may occupy greater floor space, require greater expense, and entail cleaning of multiple receptacles.

The present disclosure describes waste receptacles configured to removably receive and secure liners of different sizes or multiple liners. For example, a user may use a multiple small liners in a same receptacle to receive waste from different sources, or may use a single large liner in that same receptacle when a larger amount of waste is expected to be received. The user may also choose to use a single small liner when a larger amount of waste is expected to be received. Thus, a single waste receptacle according to the present disclosure may conveniently accommodate different types and amounts of waste in appropriate liners.

Liners may be used to promote cleanliness and reduce the need to frequently wash or otherwise clean the receptacle. Liner retention and removal continues to present challenges to a typical user. Liners range in sizes, for example, common kitchen liners being 13 gallons, and larger sizes being 20 gallons or 30 gallons, conforming to typical nominal volumes of waste receptacles. When a liner of such or greater volumes is full with waste, or occupied with relatively heavy waste, the weight of the filled liner can be significant, and can cause the liner to collapse into the container. While a liner may be disposed about the rim, the liner may get detached from the rim. Additionally, when a liner is removed from the receptacle, the liner may create a suction effect between the liner and the receptacle. This effect can provide difficulty when trying to remove the filled liner. Even when empty, a liner may disengage from a receptacle, and may benefit from an attachment or retention means. Thus, securing different liners and resisting inadvertent detachment may remain challenging. Some receptacles may incorporate retention arms and/or a hard-plastic liner or sub-receptacle. While retention arms may make it easier to install a new liner, they may make it more cumbersome to remove a full liner; as the arms need to be raised for removal of the liner. A separate hard-plastic liner is also difficult to remove from the receptacle for both installation and removal of the liner.

While certain receptacles do allow using more than one liner or different liner sizes, such receptacles typically require different sub-housings stacked within a larger housing, or intermediate panels, or dividing rods, or other such components. These additional components present additional surfaces, crevices, or junctions that may accumulate debris and necessitate additional cleaning. Such receptacles may also require additional manufacturing steps and material for assembling and joining components. Some such receptacles may also require liner locking components or moving or separable components, which may increase complexity and cost of manufacturing, use, and maintenance. Such components may also get separated from receptacles and lost. Waste receptacles according to the present disclosure provide a relatively simpler construction, and may not require such additional features.

For example, a waste receptacle according to the present disclosure may include a rim defining a rim opening, and a plurality of retention tabs extending from the rim. These retention tabs may be used to secure a single liner, or multiple liners. The plurality of retention tabs includes a notched retention tab defining a retention notch between first and second tab portions. The first and second tab portions are configured to respectively retain first and second liners received within the rim opening. Thus, when required, portions of more than one liner may be retained using the tabs and the notch, which can admit and receive multiple liners.

Thus, multiple sizes, such as commonly used 13 gallon or 20 gallon liners (for example, bags) may be used in a single receptacle without requiring a dividing component. A single liner of a larger size, for example, such a 30 gallon liner may also be secured using the same retention features.

Using the retention tabs and rim may also facilitate hiding the liner from view, for example, with a lid that covers the rim and tabs.

When a liner is secured to a receptacle, the material of the liner may stretch, or otherwise extend beyond the size of the receptacle, leading to a disordered appearance and liner portions that may extend or protrude from the receptacle in an unpleasing manner. In embodiments, waste receptacles according to the present disclosure may include a cinch extending from the rim. The cinch may facilitate securing loose or stretched portions of the liner. For example, the cinch may include a cinch base defining a pair of openings, and a cinch tab between the pair of openings. The cinch is configured to receive a portion of a liner received in the rim opening between the openings and across the cinch tab. The openings may be used to push the liner across the cinch tab. The cinch tab may extend from the cinch base away from the rim opening. The cinch tab may secure a portion of the liner between the openings. Thus, the cinch may promote a clean and ordered securement of the liner to the receptacle.

FIG. 1A is a perspective view of a waste receptacle 10 including a rim 12, a housing 14, and a plurality of retention tabs 18. The plurality of retention tabs 16 are configured to secure one or more liners (not shown in FIG. 1A) to the rim 12.

In embodiments, the waste receptacle 10 may not include a further housing or container, and may substantially only include the rim 12 to receive a liner. In other embodiments, the rim 12 may be coupled to, or integrally extend from, the housing 14 of the waste receptacle. In some embodiments, the rim 12 may be removably securable to an independent housing or container to convert that housing or container to the waste receptacle 10.

The housing 14 may be formed of any material suitable for holding or supporting waste. The housing 14 may be formed of one or more materials, or a composite material. In some embodiments, one or more materials forming the housing 14 may include one or more of a metal, an alloy, a polymer, a glass, a ceramic, a fabric, a composite, or combinations thereof. The material may be rigid, semi-rigid, or flexible. In some embodiments, the housing 14 is substantially rigid, for example, tending to maintain its shape and resist deformation.

The housing 14 may have any general shape, for example, cuboidal, rectangular cuboidal, cylindrical, curved, polygonal, or any other suitable shape. The housing 14 may include faces or walls that may be smoothly interconnected, or may intersect at vertices or edges. For example, the housing 14 may include a housing wall. In some embodiments, the housing 14 may have substantially the same cross-sectional area along a height of the housing. In other embodiments, the cross-sectional area may vary, for example, continuously increase along a height, or decrease, or any other variation. The housing 14 may define at least one opening, for example, an upper opening, to receive a liner. In some embodiments, the housing 14 may be open at one end and closed at another end.

In some embodiments, the housing 14 may be open at both ends, for example, being in the form of a circular ring, an ellipsoidal ring, a toroid, a square-shaped ring, a polygonal ring, or any complex structure that does not have a bottom, but is capable of holding a liner. In some such embodiments, the housing 14 may be held by a stand. For example, the housing 14 may substantially only include rim 12 or a similar structure, without including a wall or a container. For example, the housing 14 may not include a housing wall separate from the rim 12.

The rim 12 may be formed of any material described with reference to the housing 14. The rim 12 defines a rim opening 16 configured to receive the liner. The liner may be formed of one or more materials including a polymer, or any other suitable liner material. In some embodiments, the liner includes a reinforced material. The liner may be placed into the housing 14 through an opening, and may be pushed, pulled, stretched, or otherwise disposed in the housing 14, for example, being generally secured about or along the rim 12. The liner may be secured through the rim opening 16 of the rim 12, with an upper portion of the liner being secured about or to the rim 12. Thus, waste may be disposed through the rim opening 16 into an interior of the liner.

The rim 12 may be rectangular. The rim 12 may be integrated with and continuous with a body of the housing 14, or may be formed as a separate component permanently or temporarily secured to housing 14. The rim 12 may define a lateral surface extending outward relative to rim opening 16, and may further define a lip transverse to the lateral surface. The lip may extend upward or downward. As an example, the lip extends downwards, as shown in FIG. 1A.

The retention tabs 18 facilitate securing the liner to the rim 12. The retention tabs 18 may be configured to retain different sizes and numbers of liners. For example, the retention tabs 18 may receive first and second liners, or a single third liner being larger than each of the first and second liners. In some embodiments, each retention tab of the plurality of retention tabs is identical in shape and size. In other embodiments, different retention tabs may have a generally similar shape while having different sizes, or have differ in one or more of shape, size, or orientation. In some embodiments, one or more retention tab of the plurality of retention tab may exhibit a difference in shape or size.

In some embodiments, the entirety of a retention tab is flat and continuously extend in an outward direction relative to the rim opening 16. In other embodiments, one or more portions of a retention tab may be flat, polygonal, curved, angled, or otherwise contoured. In some embodiments, the entirety of a retention tab may be curved or contoured. The curve may be a simple curve with a single radius of curvature, or may be a complex curve or contour with multiple radii of curvature. In some embodiments, one or more portions of a retention tab may not extend outward, for example, extending strictly upward, or even inward, however, having at least one portion extending outward.

A portion of or an entirety of one or more of retention tabs 16 may be ribbed, channeled, dotted, wavy, zig-zag, or otherwise textured, to promote liner retention. One or more retention tabs 18 may define a continuous uninterrupted and unbroken surface, or may define one or more voids or openings along retention tab 18.

The plurality of retention tabs 18 may be formed of any material described with reference to the rim 12 or the housing 14. In some embodiments, two or more of the rim 12, the housing 14, and the retention tabs 18 are formed of the same material. In some such embodiments, the rim 12, the housing 14, and the retention tabs 18 constitute a unitary structure. In some embodiments, the housing 14 is not present, and the retention tabs 18 are unitary with the rim 12. For example, the rim 12, the housing 14, and/or the retention tabs 18 may be machined, molded, stamped, or additively manufactured as an integrated structure. In other embodiments, the retention tabs 18 may be formed of a different material from one or both of the rim 12 or the housing 14, and may be fabricated using the same or similar technique as or using a different technique from one or both of the rim 12 or the housing 14. In some embodiments, each retention tab of the plurality of retention tabs 18 is integral with the rim 12.

In some embodiments, the retention tabs 18 are formed as a separate component and secured to the rim 12, or to the housing 14. For example, the retention tabs 18 may be welded, adhered, snapped, friction-fit, over-molded, stamped, or otherwise secured to the rim 12 or a portion of the housing 14.

In embodiments, the rim 12 defines a plurality of corners. At least one retention tab of the plurality of retention tabs 18 may be disposed at or along a corner of the plurality of corners. In some such embodiments, the at least one retention tab 18 defines a bend along the corner.

In embodiments, the rim 12 extends along a rectangular path. For example, the rim 12 may be generally rectangular, and with rounded corners.

In embodiments, each retention tab of the plurality of retention tabs 18 is disposed at or along a respective corner of the plurality of corners. In embodiments, a number of retention tabs is the same as a number of corners. In some embodiments, the plurality of retention tabs 18 consists of four retention tabs.

To accommodate multiple liners extending through a retention tab, one or more of the retention tabs 18 may include a notch.

FIG. 1B is a partial front view of the waste receptacle 10 of FIG. 1A showing a notched retention tab 20 extending from the rim 12. The notched retention tab 20 is one of the plurality of retention tabs 18, and may be formed and fabricated as described with reference to the retention tabs 18. Thus, the waste receptacle 10 may include the rim 12 defining the rim opening 16, and the plurality of retention tabs 18 extending from the rim 12, with the plurality of retention tabs 18 including the notched retention tab 20. The notched retention tab 20 may extend integrally from the rim 12.

The notched retention tab 20 defines a retention notch 22 between first and second tab portions 24 and 26. The first and second tab portions are configured to respectively retain first and second liners received within the rim opening 16. For example, the first liner may contact and be supported by the first tab portion 24 along the notch 22, and the second liner may contact and be supported by the second tab portion 26 along the notch 22.

In embodiments, the notched retention tab 20 (or another retention tab that does not include a notch) defines a base portion 28 adjacent the rim 12 and an upper edge 30 extending from the base portion 28 and away from the rim opening 16. In embodiments, the notched retention tab 20 extends along a contour. In embodiments, the notched retention tab 20 extends outward from the rim 12 in a direction from the base 28 of the notched retention tab 20 to the upper edge 30 of the notched retention tab 20.

The upper edge 30 may project outward, or be oriented outward, relative to the rim opening 16. For example, another portion of the retention tab 20 between the base portion 28 and the upper edge 30 may be oriented inward vertical, or outward, with the upper edge 30 yet oriented outward. In some embodiments, the retention tab 20 (or another retention that that does not include a notch) includes a curved portion between the base portion 28 and the upper edge 30. For example, the upper edge 30 may flare outward relative to the rim opening 16. In some embodiments, instead of the curved portion, the notched retention tab 20 may include a portion having any suitable shape between the base portion 28 and the upper edge 30. The base portion 28 itself may be oriented outward, inward, or vertical, and may be flat, textured, contoured, or curved.

In embodiments, the retention notch 22 has a curved contour. In embodiments, the retention notch 22 defines a neck 32. The neck 32 may promote securing one or more liners extending through the notch 22.

In some embodiments, the notched retention tab 20 (or another retention tab without a notch) is inset relative to the rim 12. For example, the base portion 28 of the notched retention tab 20 may be inset from an outer edge of the rim 12 relative to the rim opening 16. The inset distance may be any suitable distance. The inset may promote concealment of the liner secured to the retention tab 20, for example, by allowing a lid to cover or contact an outer portion of the rim 12 while covering or otherwise concealing the secured liner and the retention tab 20.

FIG. 1C is a partial perspective view of the waste receptacle 10 of FIG. 1A showing a first notched retention tab 20*a*. FIG. 1D is a partial perspective view of the waste receptacle 10 of FIG. 1A showing a second notched retention tab 20*b*. For example, the notched retention tab 20 may be the first notched retention tab 20*a*, and the plurality of retention tabs 18 further may include the second notched retention tab 20*b*. The second notched retention tab 20 may oppose the first notched retention tab 20*a* across the rim opening 16. In embodiments, the first notched retention tab 20*a* is diagonally opposed the second notched retention tab 20*b* across the rim opening 16, as shown in FIGS. 2A to 2C.

FIG. 2A is a partial perspective view of the waste receptacle 10 of FIG. 1A receiving two small liners secured in the plurality of retention tabs 18, including the two notched tabs 20*a* and 20*b*. FIG. 2B is a partial perspective view of the waste receptacle 10 of FIG. 1A receiving a single large liner secured in the plurality of retention tabs 18. FIG. 2C is a partial perspective of the waste receptacle of FIG. 1A receiving a single small liner secured in the second notched retention tab 20*b* of the plurality of retention tabs 18.

Figure 2B:
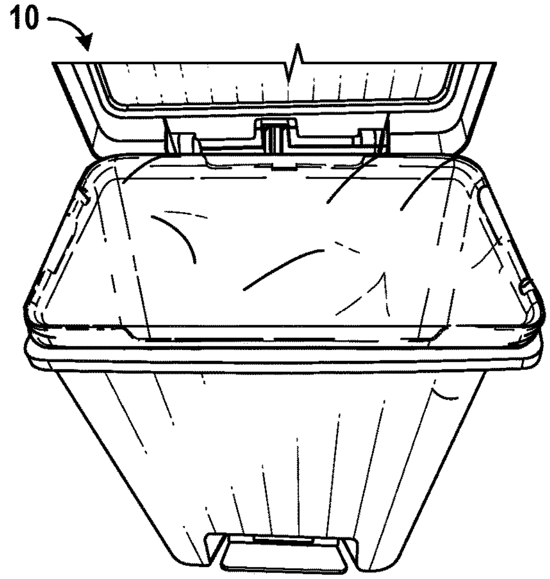
FIG. 2B is a partial perspective view of the waste receptacle of FIG. 1A receiving a single large liner secured in the plurality of retention tabs.
Figure 2C:
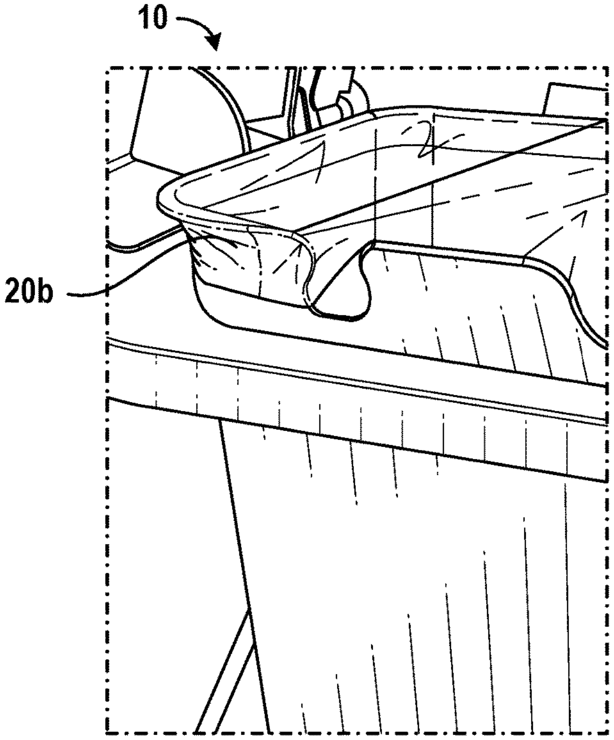
FIG. 2C is a partial perspective of the waste receptacle of FIG. 1A receiving a single small liner secured in a notched retention tab of the plurality of retention tabs.

As seen in FIGS. 2A to 2C, the plurality of retention tabs 18, including the notched retention tabs 20*a* and 20*b*, may be used to secure different numbers and sizes of liners. For example, as shown in FIG. 2B, the plurality of retention tabs 20 is configured to receive a single liner about the entire plurality of retention tabs 20 (instead of the first and second liners). As alternatively shown in FIGS. 2A and 2C, the same receptacle 10 may receive two liners, or a single smaller liner.

In embodiments, the plurality of retention tabs 20 includes at least one non-notched retention tab 32. In some such embodiments, the at least one non-notched retention tab 32 comprises first and second non-notched retention tabs opposed across the rim opening. In some such embodiments, the notched retention tab 20 may be between the first and second non-notched retention tabs along the rim 12.

In some embodiments, the plurality of retention tabs 18 consists of four tabs, and the four tabs consist of first and second notched tabs 20*a* and 20*b*, and two intervening non-notched retention tabs. The notched tabs 20*a* and 20*b* may be diagonally opposed to each other, and the non-notched tabs may also be diagonally opposed to each other. For example, notched and non-notched tabs may be alternatingly positioned along successive corners. In embodiments, each of the plurality of retention tabs is notched.

In embodiments, the waste receptacle further includes a lid 40. In a closed configuration, the lid may extend across the opening 16 to close the receptacle 10. The lid 40 may be operably coupled to a pedal 42, for example, to cause the lid 40 to be moved away from the rim 12 to expose the opening 16. In some embodiments, the lid 40 surrounds and covers the rim 12, for example, in a closed configuration of the lid 40.

While the plurality of retention tabs may be used to secure one or more liners, waste receptacles according to the disclosure may be provided with additional features to secure a liner, for example, a cinch.

Figure 3A:
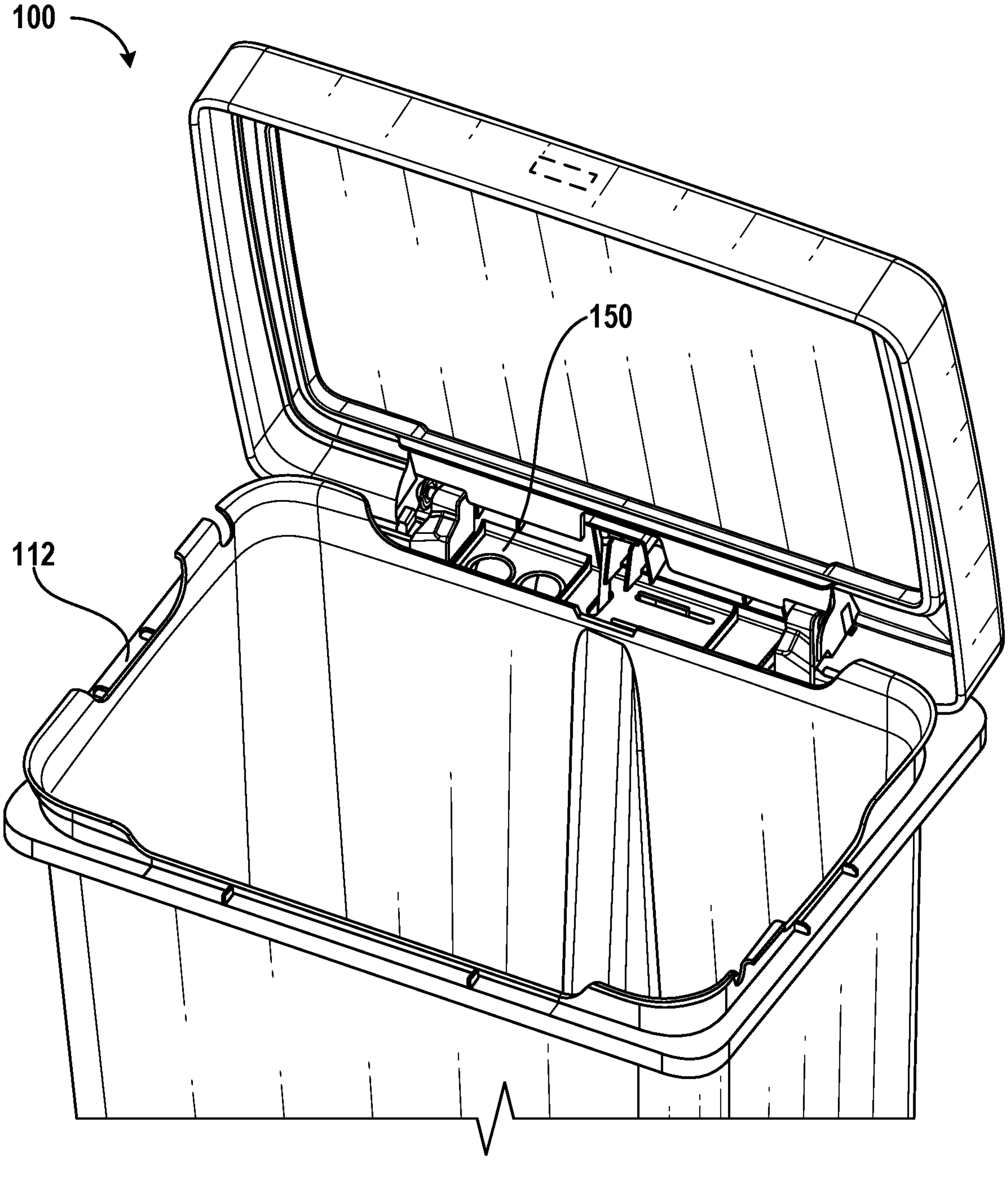
FIG. 3A is a partial perspective view of a waste receptacle including a rim and a cinch.
Figure 3B:
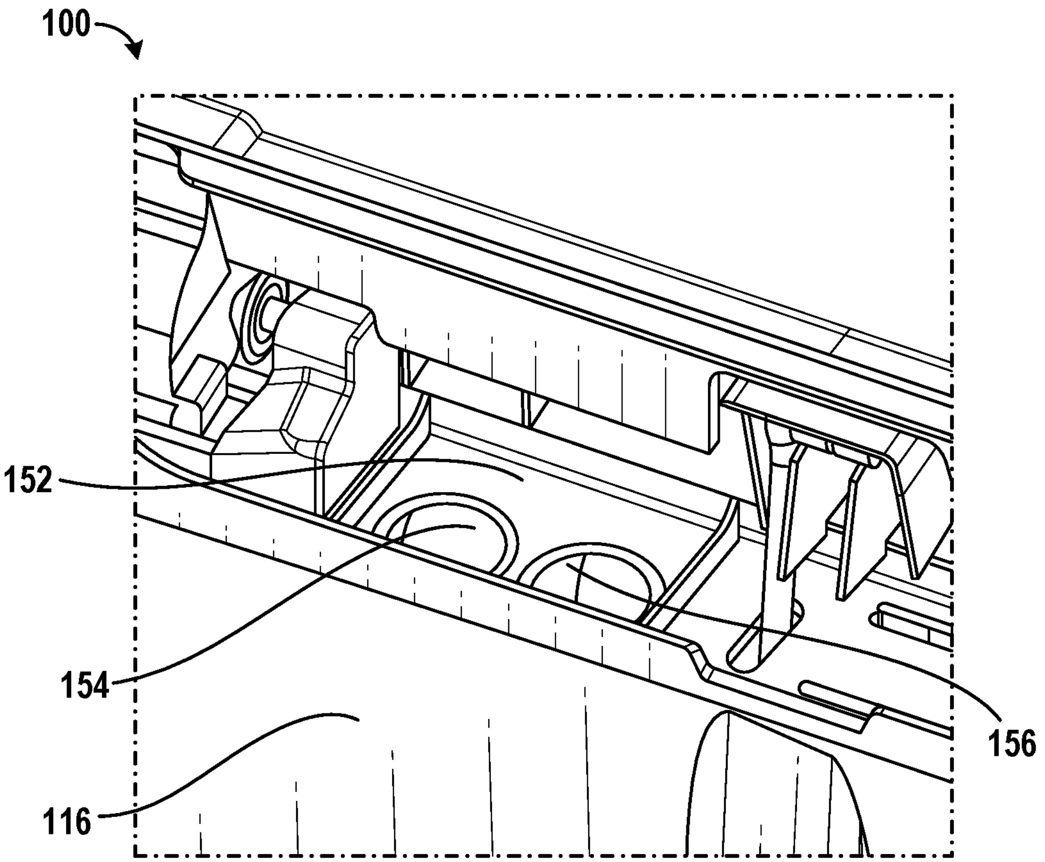
FIG. 3B is a partial enlarged view of the waste receptacle of FIG. 3A showing the cinch.
Figure 3C:
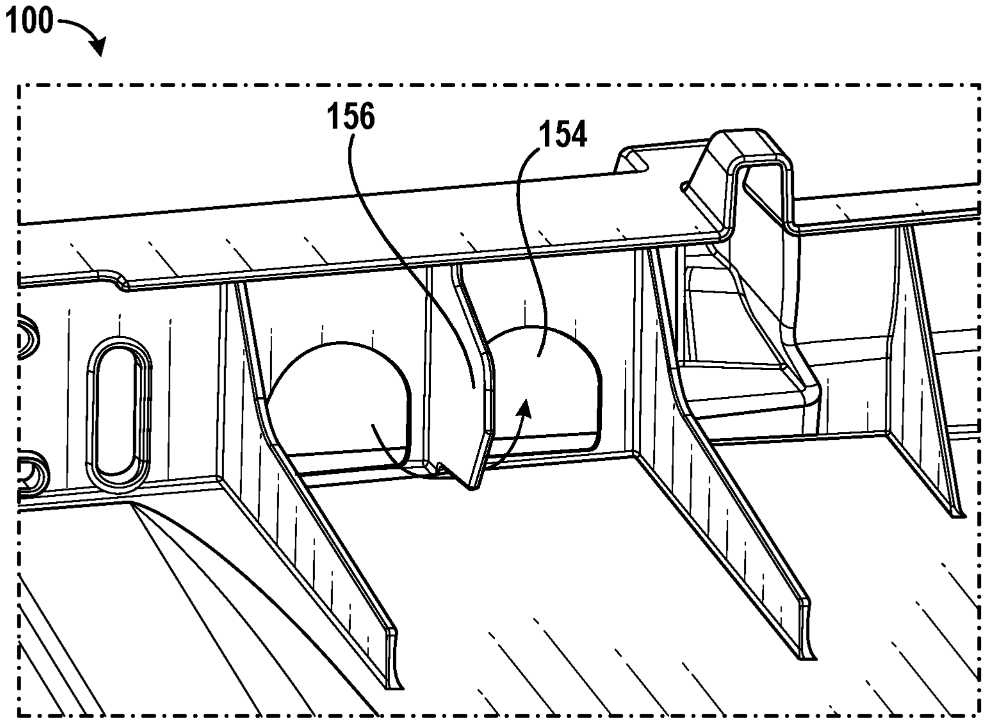
FIG. 3C is a partial rear view of the waste receptacle of FIG. 3A showing the cinch.

FIG. 3A is a partial perspective view of a waste receptacle 100 including a rim 112 and a cinch 150. FIG. 3B is a partial enlarged view of the waste receptacle 100 of FIG. 3A showing the cinch 150. FIG. 3C is a partial rear view of the waste receptacle 100 of FIG. 3A showing the cinch 150.

The waste receptacle 100 may be substantially similar to the waste receptacle 10, and may include (or exclude) the housing 14 or the plurality of retention tabs. The waste receptacle 100 includes the rim 112 (similar to the rim 12) defining a rim opening 116 (similar to the rim opening 16), and the cinch 150 being extending from the rim 112. The cinch 150 may be integrally formed from a portion of the rim 112, or may be a separate component coupled to the rim 112. The material of construction of the cinch 150 may be the same as or different from that of the rim 112.

The cinch 150 may include a cinch base 152 defining a pair of openings 154, and a cinch tab 156 between the pair of openings 154. The cinch tab 156 may extend from the cinch base 150 away from the rim opening 116. The cinch tab 156 may be substantially perpendicular to the cinch base 152. The cinch base 150 may be defined by an upper surface of the rim 112.

The cinch 150 is configured to receive a portion of a liner received in the rim opening 116 between the openings 154 and across the cinch tab 156, as marked with the arrow in FIG. 3C. While a single cinch 150 is shown in FIGS. 3A to 3C, the waste receptacle 100 may include more than one cinch.

In some embodiments, the cinch 150 may be present in a panel or hinge coupling a lid to the rim 112.

Thus, the cinch 150 may be used to secure a loose portion of the liner, or to otherwise securely fasten a liner to the rim 112.

Though the disclosed examples include particular arrangements of a number of parts, components, features, and aspects, the disclosure is not limited to only those examples or arrangements shown. Any one or more of the parts, components, features, and aspects of the disclosure may be employed alone or in other arrangements of any two or more of the same.

Although certain product features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Unless otherwise noted, the terms used herein are to be understood according to conventional usage by those of ordinary skill in the relevant art. In addition to the definitions of terms provided below, it is to be understood that as used in the specification and in the claims, "a" or "an" may mean one or more, depending upon the context in which it is used.

Throughout this application, the term "include," "include(s)" or "including" means "including but not limited to." Note that certain embodiments may be described relating to a single glass, but the corresponding description should be read to include embodiments of two or more glasses. Different features, variations, and multiple different embodiments are shown and described herein with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, apparatuses, methods, devices, and/or techniques. It is, of course, not possible to describe every conceivable combination of components and/or methods for purposes of describing the various elements of the disclosure, but it may be recognized that many further combinations and permutations of the disclosed elements are possible. Accordingly, it may be apparent that various modifications may be made to the disclosure without departing from the scope thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A waste receptacle comprising:
- a housing;
- a rectangular rim defining a rim opening; and
- a plurality of retention tabs extending from the rim,
- wherein the rim defines a plurality of corners, and wherein the plurality of retention tabs comprises a notched retention tab defining a retention notch between first and second tab portions,
- wherein the first and second tab portions are configured to respectively retain first and second liners received within the rim opening such that the first and second liners are diagonally opposed along the rim opening, and
- wherein the plurality of retention tabs is configured to receive a third liner larger than each of the first and second liners, and
- wherein at least one retention tab of the plurality of retention tabs is disposed at or along a corner of the plurality of corners, wherein a number of retention tabs is the same as the plurality of corners, and wherein the plurality of retention tabs consists of four retention tabs.

2. The waste receptacle of claim 1, wherein the retention notch has a curved contour.

3. The waste receptacle of claim 1, wherein the retention notch defines a neck.

4. The waste receptacle of claim 1, wherein the notched retention tab extends along a contour.

5. The waste receptacle of claim 1, wherein the notched retention tab extends outward from the rim in a direction from a base of the notched retention tab to an upper edge of the notched retention tab.

6. The waste receptacle of claim 1, wherein the notched retention tab is inset from an outer edge of the rim relative to the rim opening.

7. The waste receptacle of claim 1, wherein the notched retention tab is integral with the rim.

8. The waste receptacle of claim 1, wherein each retention tab of the plurality of retention tabs is integral with the rim.

9. The waste receptacle of claim 1, wherein the notched retention tab is a first notched retention tab, and wherein the plurality of retention tabs comprises a second notched retention tab opposing the first notched retention tab across the rim opening.

10. The waste receptacle of claim 9, wherein the first notched retention tab is diagonally opposed the second notched retention tab across the rim opening.

11. The waste receptacle of claim 1, wherein the plurality of retention tabs is configured to receive a single liner about the entire plurality of retention tabs instead of the first and second liners.

12. The waste receptacle of claim 1, wherein the plurality of retention tabs comprises at least one non-notched retention tab.

13. The waste receptacle of claim 12, wherein the at least one non-notched retention tab comprises first and second non-notched retention tabs opposed across the rim opening.

14. The waste receptacle of claim 13, wherein the notched retention tab is between the first and second non-notched retention tabs along the rim.

15. The waste receptacle of claim 1, wherein the at least one retention tab defines a bend along the corner.

16. The waste receptacle of claim 15, wherein each retention tab of the plurality of retention tabs is disposed at or along a respective corner of the plurality of corners.

17. A waste receptacle comprising:
- a rim defining a rim opening, wherein the rim extends along a rectangular path and wherein the rim defines a plurality of corners;
- a housing coupled to the rim, wherein the housing integrally extends from the rim;
- a lid operably coupled to a pedal, wherein the lid surrounds and covers the rim; and
- a plurality of retention tabs extending from the rim, wherein at least one retention tab of the plurality of retention tabs is disposed at or along a corner of the plurality of corners, wherein a number of retention tabs is the same as the plurality of corners, and wherein the plurality of retention tabs consists of four retention tabs;

wherein the plurality of retention tabs comprises a notched retention tab defining a retention notch between first and second tab portions, wherein the first and second tab portions are configured to respectively retain first and second liners received within the rim opening.

* * * * *